FREQUENCY DIVERSITY TRANSMITTING SYSTEM

Filed Nov. 22, 1963 2 Sheets-Sheet 1

INVENTOR.
ROBERT T. ADAMS

BY

Hopgood & Calimafde
ATTORNEYS

March 21, 1967 R. T. ADAMS 3,310,742

FREQUENCY DIVERSITY TRANSMITTING SYSTEM

Filed Nov. 22, 1963 2 Sheets-Sheet 2

INVENTOR.
ROBERT T. ADAMS
BY
Hopgood & Calimafde
ATTORNEYS

United States Patent Office 3,310,742

Patented Mar. 21, 1967

3,310,742
FREQUENCY DIVERSITY TRANSMITTING SYSTEM

Robert T. Adams, Short Hills, N.J., assignor to Sichak Associates, Nutley, N.J., a corporation of New Jersey Filed Nov. 22, 1963, Ser. No. 325,530
4 Claims. (Cl. 325—56)

This invention relates to a communication system and more particularly, relates to a transmission system utilizing transmitting frequency diversity.

Klystrons and other high frequency transmitting tubes exhibit linear characteristics only at relatively low power levels. At high power levels saturation occurs and operation becomes non-linear. In general, the linear operating region of a klystron is below the high power operating level by a factor of ten.

Klystrons used for troposcatter work commonly have bandwidths of the order of 20 mc. In an FM system, normally, the full bandwidth is not used because of the bandwidth limitations of the transmission medium and because of the limited linearity of the klystron. Under such circumstances, it is difficult to obtain high efficiency operation as well as relatively large signals at the receiver.

An object of my invention is to provide a transmitting system in which a relatively higher signal level is received from signals transmitted from klystrons or from other power tubes which are conveniently used for transmitters.

A further object of my invention is to provide a communication system in which the relatively large bandwidth of klystrons and other transmitting tubes is more effectively utilized to achieve higher efficiency power transmission.

A further object of my invention is to provide a low cost narrow band system.

A still further object of my invention is to provide a transmitting diversity system using only single transmitter (not requiring two or more separate transmitters).

Briefly, my invention features the transmission of first and second signals of different frequencies, each signal carrying the same information modulation. The signals are amplified in a conventional power amplifier having a klystron tube or other conventional microwave tube. The amplifier signals are thereafter alternately transmitted at a predetermined switching rate. This alternate transmission operates as a substantially continuous sampling operation. The frequency of alternation is high to achieve adequate sampling of each signal and may be achieved by electronic switching. The receiver recovers the transmitted signals by decommutation action which separates one signal from the other. The rate of receiver decommutation is synchronized with that of transmitter commutation. The received signals are converted to common frequency, either that of the information, or an intermediary one. The two signals are phase adjusted to become time-coincident and are thereafter combined. Detection, however, may take place before of after combination.

Figure 1:
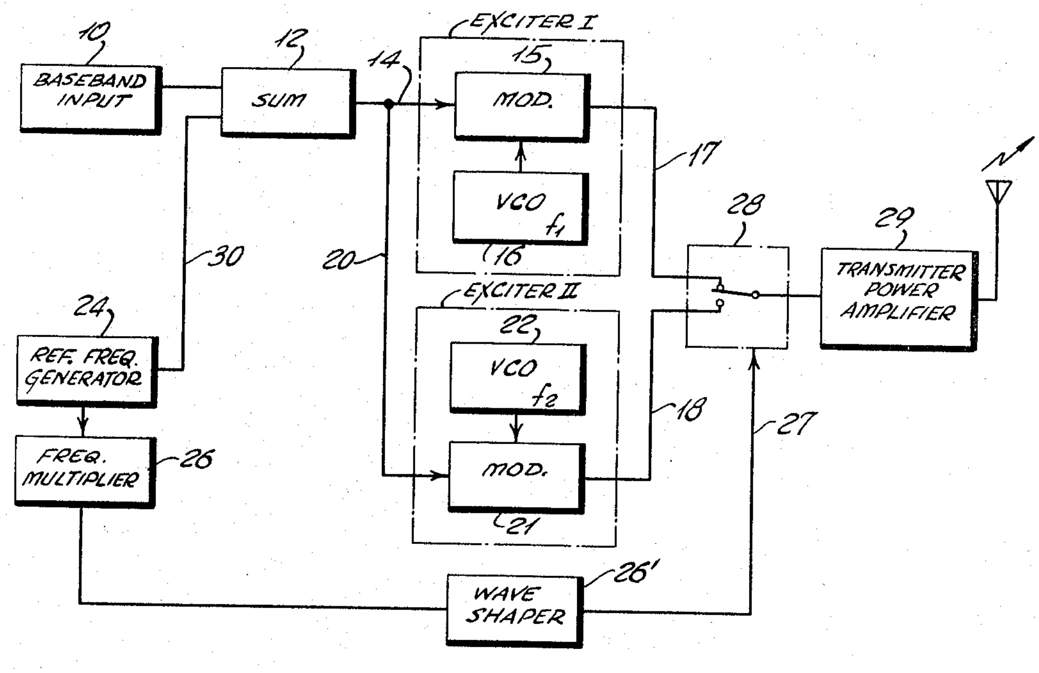
Figure 1A:
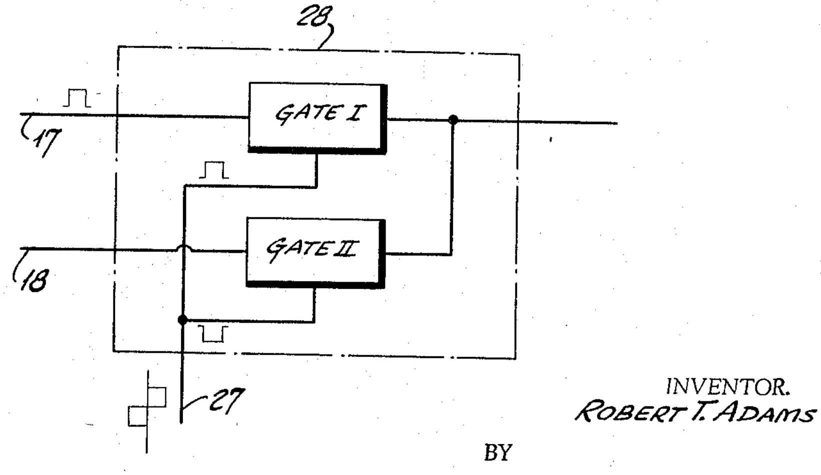
Figures 2, 3:
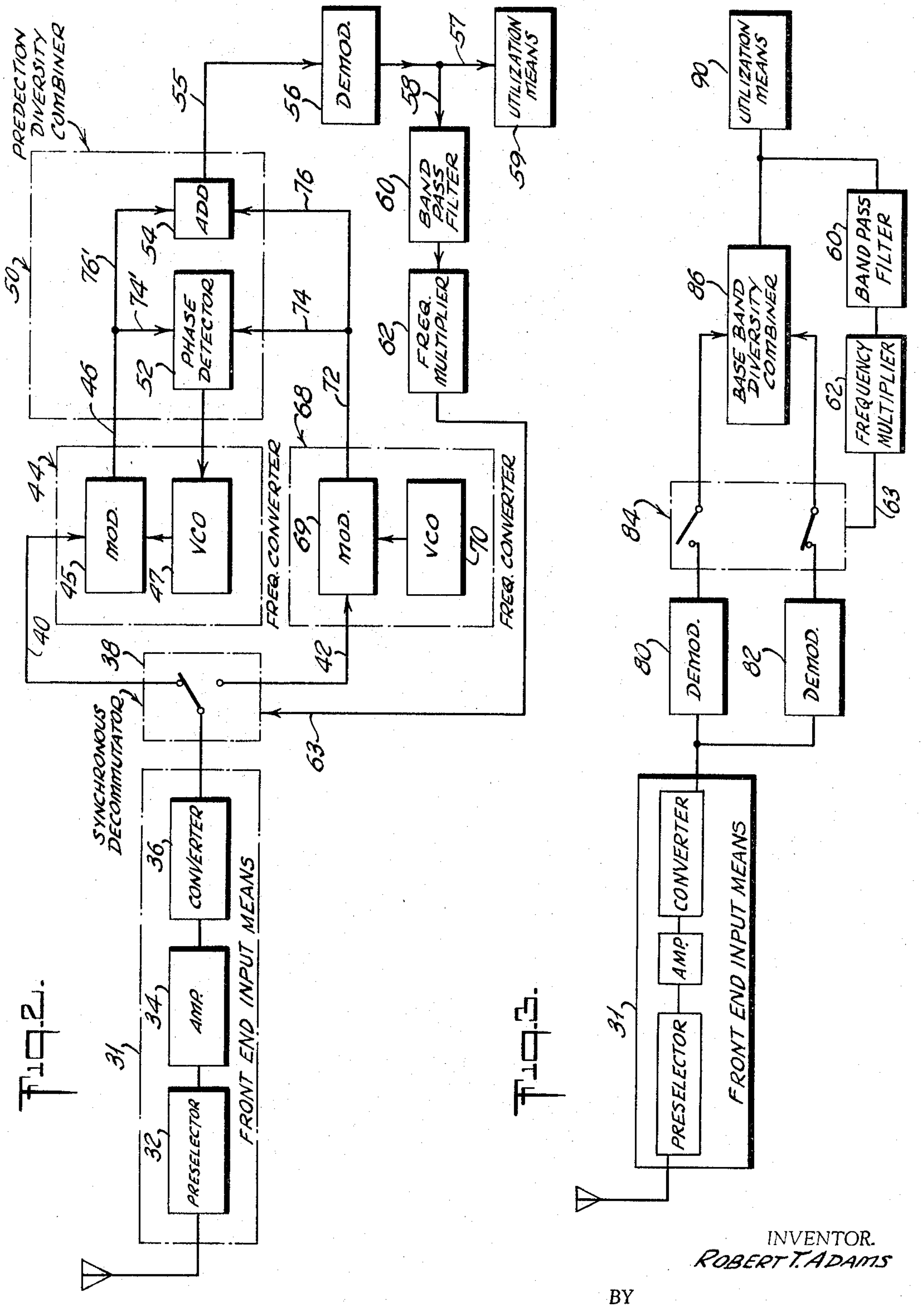

The above mentioned and other features and objects of this invention and the manner of attaining them will become more apparent and the invention itself will be best understood by reference to the following description of an embodiment of the invention taken in conjunction with the accompanying drawing, wherein:

FIGURE 1 is a block diagram of the transmitter of my frequency diversity transmitting system;

FIGURE 1*a* is a block diagram of one form of commutator used in FIGURE 1;

FIGURES 2 and 3 are different embodiments of receivers that may be utilized with the transmitting system of FIGURE 1.

Refering now to FIGURE 1, there is shown a transmitter which comprises a source of information of known frequency, shown diagrammatically as the base-band input 10. The input is applied to summing means 12 and then to Exciter I over lead 14. Summing means 12 may actually be a common input terminal to the excitor. The same input is applied over a branching lead 20 to Exciter II. The purpose of providing a summing means will be apparent later.

Each of the exciters provides carrier signals at different frequencies which are modulated by the base-band input according to conventional techniques. Exciter I comprises a modulator 15 and a control oscillator 16 producing a carrier frequency F1. Exciter II comprises a modulator 21, control oscillator 22 producing a carrier frequency F2. The outputs from Exciters I and II are applied over leads 17 and 18 to an electronic commutator 28 which is shown diagrammatically. The exciters may contain other stages of amplification which are not shown.

Commutator 28 functions as an electronic switch and samples the signals appearing on leads 17 and 18 at a high repetition rate.

As will be described later, the rate of commutation is higher than the highest frequency of the baseband but is much less than the bandwidth of the system; that is, the number of cps frequency difference between band edges of the system is much larger than the number of switch operations per second.

The electronic switch may comprise gating elements I and II as shown in FIGURE 1*a* which are opened and closed alternately in response to a control signal which appears over lead 27. This signal may be a series of alternating positive and negative pulses, and the gates may be constructed such that gate I opens in response to positive pulses and gate II opens in response to negative pulses.

The signal appearing on lead 27 is derived from a reference frequency generator 24, the output of which is multiplied at 26 and applied to a suitable wave shaper 26′ to produce the requisite pulses to open and close respective gating elements and thus control the commutator. Those skilled in the art will recognize that the electronic commutator as well as the wave shaper are conventional elements. The output from commutator 28 is applied to the transmitting power amplifier 29 which contains a conventional microwave amplifying tube, such as the above mentioned klystron, in conventional circuit arrangement. The amplified output is transmitted by the transmitting antenna as illustrated into the propagating medium.

The reference frequency is also applied over lead 30 to summing means 12 where it is added to the base-band input. The reference frequency signal, as will be described later, will be recovered to control the decommutation of the received signals.

Referring now to FIGURE 2, there is shown a receiver which may be used in conjunction with the transmitter of FIGURE 1. The receiver comprises conventional front end receiving components which are shown within a standard block 31. The preselector 32 rejects undesired signals, and the amplifier 34 and converter 36 produce an amplified IF signal.

The output from the front end 31 is applied to a synchronous decommutator 38 which essentially is the same type of commutator as shown as 28 in FIGURE 1 and may comprise gating elements suitably controlled by shaped reference signals applied over lead 63.

The outputs from synchronous decommutator 38 are applied over respective lines 40 and 42. These signals correspond with the signals produced by Exciters I and II. In order to combine the signals which appear on lines 40 and 42, they must first be brought into frequency correspondence by means of the frequency converters 44 and 68 which are connected to lines 40 and 42 respectively. Although two frequency converters are shown, it will be understood that only one frequency converter 44 is necessary, since one converter may convert the frequency of one output signal to that of the other.

In converter 44, the control oscillator 47 feeds into a modulator 45 which also receives the signal over line 40 having a carrier frequency F1. The output appearing over line 46 is applied to a pre-detection diversity combiner 50. Similarly, frequency converter 68 comprises a control oscillator 70 which feeds into a modulator 69 which also receives the signal from line 42. The output is applied over line 72 and then over lines 74 and 76 to the pre-detection diversity combiner.

The pre-detection diversity combiner comprises adding means 54 which adds or combines the signals which have appeared on input leads 76 and 76' corresponding to the outputs from the frequency converters 44 and 68.

Also, in order to provide effective combination, the signals must be in phase. The conventional pre-detection diversity combiner includes conventional means for providing this purpose. The phase adjusting circuitry of the pre-detection diversity combiner usually includes a frequency converter such as 44 as part of a phase-lock loop, but for purposes of illustration and explanation only, frequency converter 44 has been shown as a separate element. Lines 74 and 74' are branches of output lines 46 and 72 from the converters 44 and 68. When the signals on lines 74 and 74' are out of phase, an output from phase detector 52 appears, which is applied to the control oscillator 47 to correct the phase thereof. The phase of control oscillator 47 is altered by varying its frequency continuously for a short time, this time being only a fraction of the period of a cycle of the control oscillator 47. This frequency change, occurring as it does for such a short time, constitutes, in effect, a phase adjustment of the frequency of oscillator 47.

Thus, the signals which are applied to adding means 54 are in phase and are combined to provide enhanced repetition effectiveness. The information which originally appeared from the base-band input 10 is recovered by demodulation at demodulator 56, the output of which constitutes the combined signal of the base-band input and the reference frequency generator. The output from the demodulator 56 is applied over branch lines 57 and 58. Utilization means 59 coupled to line 57 includes a suitable filter to reject the reference signal and to pass the baseband signal. The reference signal appearing in line 58 passes through filter 60 which rejects signals at the baseband frequency at which time it is multiplied by frequency multiplier 62 which is similar to the frequency multiplier 26 of FIGURE 1. The output from frequency multiplier 62 is applied over line 63 to control the synchronous decommutator which may be identical with the commutator of FIGURE 1*a*.

Another embodiment of the receiver is shown in FIGURE 3 and comprises the same front end 31 as in FIGURE 2, the output of which is applied to demodulators 80 and 82 which are separately tuned to the respective frequencies of Exciters I and II. The output signals from each demodulator thus constitute the information which was produced at the baseband input 10 and these signals are at a frequency of the baseband input signal. Necessarily, the information signal is different in frequency from any of the carrier signals produced in any of the frequency converters. It will be understood that other techniques for operating commutator 28 and decommutator 38 in synchronism will occur to those skilled in the art.

The outputs from demodulators 80 and 82 are applied to a synchronous decommutator 84 which alternatively switches the demodulators into the baseband diversity combiner 86 in synchronization with the transmitted signals from synchronous commutator 28 (FIGURE 1).

The baseband diversity combiner 86 is conventional and may include similar elements as described in connection with combiner 50 of FIGURE 2 to vary the phase or relative locations of the signals appearing at the outputs of the demodulators 80 and 82.

Synchronous decommutator 84 may comprise gating elements which are alternately opened and closed by a timing signal appearing on lead 63 which is produced in a manner described in connection with FIGURE 2. It is thus possible to perform either pre-detection (FIGURE 2) or post-detection (FIGURE 3) diversity combining.

The sampling means or commutator 28 operates at a rate low enough to be compatible with overall system RF bandwith, yet high enough to reproduce the modulated signal.

For example, a baseband signal consisting of two telephone channels may occupy the band 1–12 kc. When used to modulate an FM exciter, using a modulating index of 5, for example, the significant resulting spectrum of the modulated signal will extend above and below the carrier frequency by 72 kc. More generally, the bandwidth of the significant portion of an FM signal spectrum is given by (2) (highest baseband frequency)
(modulation index and 1)

In the assumed case, the significant bandwidth is 144,000 c.p.s.

In order to reproduce the waveform of this bandwidth, it is known that a satisfactory sampling rate may be twice the bandwidth. A more complete explanation of the determination of a minimum satisfactory sampling rate is contained in the International Telephone and Telegraph Reference Data for Radio Engineers, 4th ed., p. 538–539.

Since the significant bandwith is 144 kc., a sampling rate of 288,000 times per second is satisfactory.

The sampling waveform is in the nature of a square wave which may be thought of as an envelope for each transmitted burst of energy. To provide sufficiently accurate transmission of this waveform, the bandwidth of the klystron must accommodate the 5th or 7th harmonics of the sampling rate. In the case of the 7th harmonic, the bandwidth must be at least equal to 7 times 288,000 or 2,116,000. Since klystron bandwidths of 10 to 20 mc. are usual, the sampling waveform is transmitted with sufficient accuracy.

It will be seen that the spectrum transmitted may be regarded as if it had been delivered by two separate klystrons of half the original power and the result is a time-sharing or time-multiplex output of two frequencies, each with 3 db less power.

While the foregoing description sets forth the principles of the invention in connection with specific apparatus, it is to be understood that this description is made only by way of example, and not as a limitation of the scope of the invention as set forth in the objects thereof and in the accompanying claims.

What is claimed is:

1. An apparatus for frequency diversity transmitting comprising:
   - base band source means providing input information signals,
   - a first exciting means comprising a first modulator and a first oscillator at a first frequency,
   - a second exciting means comprising a second modulator and a second oscillator at a second frequency,
   - means for continuously applying the said information signals to each of said modulators as modulating signals,
   - single transmitting means,
   - switching means for continuously switching the output from the first and second modulators sequentially to said transmitting means,
   - the frequency of switching being relatively high compared to said first and second frequencies.

2. The apparatus of claim 1 including means receiving and recovering said transmitted switched signals, including means detecting and combining said received signals including means for adjusting the time relationship of such signals as to be in time correspondence.

3. The apparatus of claim 1 including means for receiving said transmitted switched signals, means for converting said signal to a common frequency, means for combining and detecting the information modulation from said signals.

4. The apparatus of claim 2 including a source means providing a timing signal controlling said switching means, means for transmitting said timing signal as a modulation component from said transmitting means, said receiving means having a receiving switching means, and including a receiving detecting means responsive to said timing frequency component to control said switching means.

References Cited by the Examiner

UNITED STATES PATENTS

| | | | |
|---|---|---|---|
| 1,742,902 | 1/1930 | Deloraine et al. | 343—176 |
| 2,895,128 | 7/1959 | Bryden | 325—26 X |
| 2,951,152 | 8/1960 | Sichak et al. | 325—305 X |
| 3,020,399 | 2/1962 | Hollis. | |
| 3,045,114 | 7/1962 | Mindes | 325—305 X |
| 3,197,563 | 7/1965 | Hamsher et al. | |
| 3,226,644 | 12/1965 | Goode et al. | 343—204 X |
| 3,239,761 | 3/1966 | Goode | 325—15 X |

DAVID G. REDINBAUGH, *Primary Examiner.*

JOHN W. CALDWELL, *Examiner.*